April 18, 1961 E. R. ZIEGLER 2,979,751
WINDSHIELD CLEANING SYSTEM
Filed Dec. 26, 1957 2 Sheets-Sheet 1
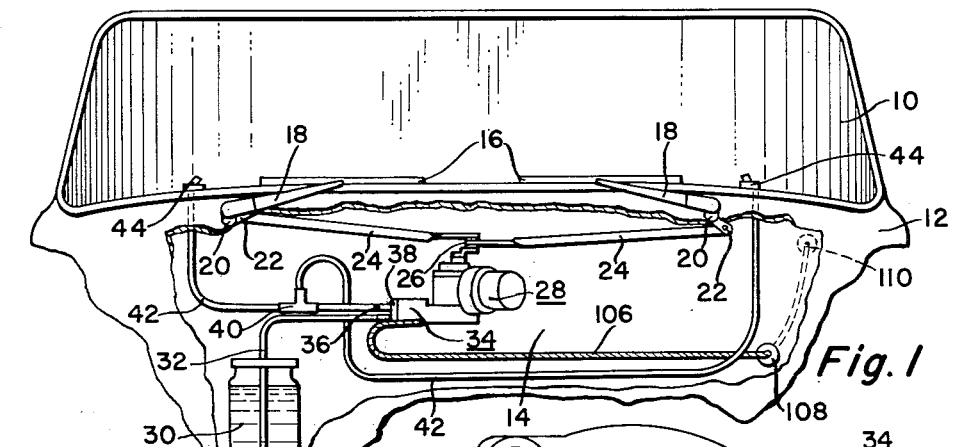
Fig. 1
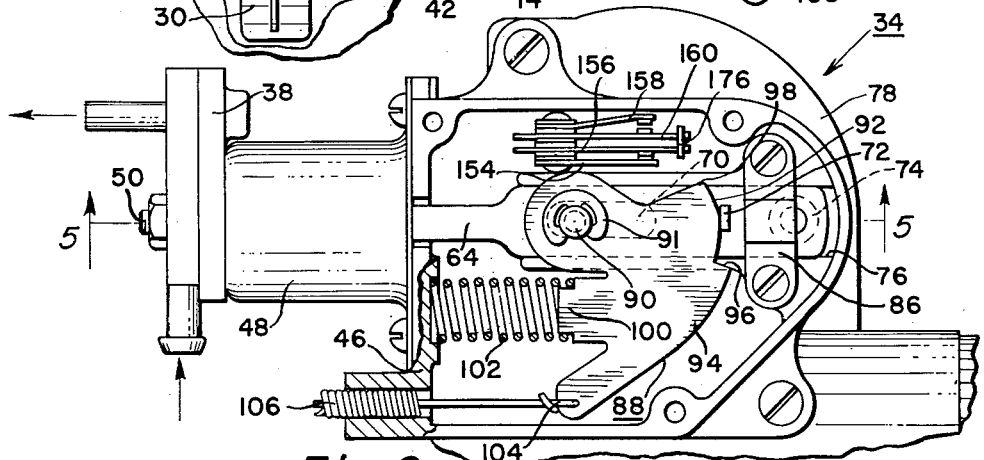
Fig. 2
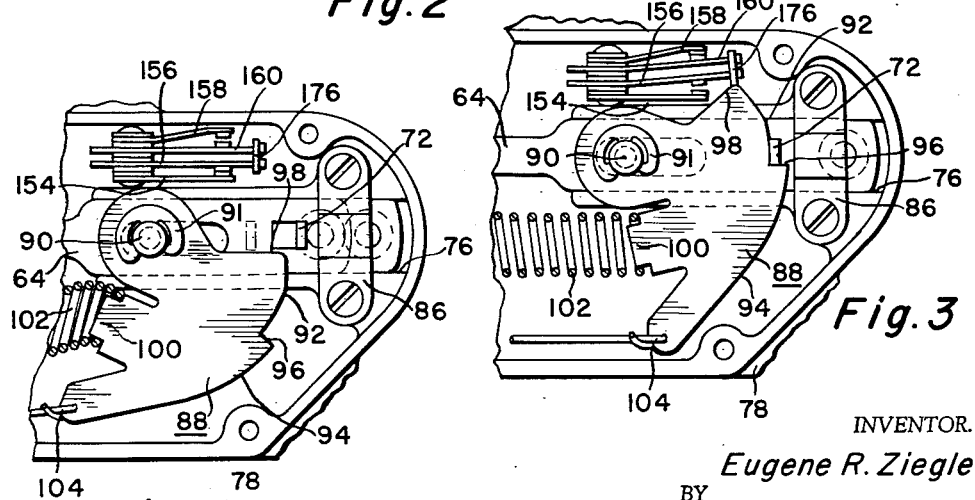
Fig. 3
Fig. 4
INVENTOR.
Eugene R. Ziegler
BY
M. H. Strickland
His Attorney April 18, 1961 E. R. ZIEGLER 2,979,751
WINDSHIELD CLEANING SYSTEM
Filed Dec. 26, 1957 2 Sheets-Sheet 2

INVENTOR.
Eugene R. Ziegler
BY
M. H. Strickland
His Attorney

United States Patent Office 2,979,751
Patented Apr. 18, 1961

2,979,751
WINDSHIELD CLEANING SYSTEM

Eugene R. Ziegler, Spencerport, N.Y., assignor to General Motors Corporation, Detroit, Mich., a corporation of Delaware Filed Dec. 26, 1957, Ser. No. 705,198

15 Claims. (Cl. 15—250.02)

This invention pertains to the art of windshield cleaning, and particularly to a system wherein solvent is sprayed onto a windshield conjointly with movement of a windshield wiper blade thereacross to clean the windshield.

In my prior application, Serial No. 634,867, filed January 18, 1957, now Patent No. 2,878,505, a windshield cleaning system comprising an electric motor for actuating windshield wipers and a washer pump is disclosed. In this system upon closure of the washer control switch, the electric motor is energized so as to effect conjoint operation of the washer and wipers; the washer pump discharges intermittent squirts of liquid solvent onto the windshield for a predetermined number of wiper strokes during the conjoint operation and is thereafter automatically stopped; and the wipers continue to operate for a predetermined number of strokes constituting a drying cycle, after which the wipers are automatically arrested by deenergization of the electric motor. In this type of system it has been found that the feature of automatically arresting the wipers does not always produce the desired result of cleaning the windshield, particularly where the windshield is of a compound curvature, that is, curved about both the vertical and horizontal axes. In compound curved windshields of this type the liquid solvent may cling to the windshield above the path traversed by the wipers, due to the hump in the windshield caused by curvature about the horizontal axis, and after the wipers have been automatically arrested, this liquid solvent runs down the windshield to streak the same thereby rendering it necessary for the operator to again turn on the windshield wipers for clear vision. The present invention relates to an improved cleaning system wherein the number of wiper strokes during which the washer is operative is manually controlled as well as the number of wiper strokes for drying the windshield being manually controlled by the operator.

Accordingly, among my objects are the provision of a manually controlled washer pump driven by an electric motor, or other rotary means; the further provision of a manually controlled intermittent squirt type washer pump operated by a wiper motor in timed relation with the oscillation, or strokes, of the wiper blades; the further provision of a manually controlled windshield cleaning system for effecting conjoint operation of wipers and a washer; the further provision of a windshield cleaning system wherein the number of wiper strokes for drying the windshield after operation of the washer is manually controlled; and the still further provision of a manually controlled cam, capable of either foot or hand actuation, for controlling the operation of both the washer and the wiper during conjoint operation thereof.

The aforementioned and other objects are accomplished in the present invention by embodying a manually controlled interruptible driving connection between the wiper motor and the washer pump together with two independent switches for energizing the wiper motor. Specifically, the wiper motor and wiper actuating mechanism may be of the type shown in copending application, S.N. 686,432 filed September 26, 1957, in the name of Harry W. Schmitz and assigned to the assignee of this invention. Thus, the electric motor is of the unidirectional type and drives a crank assembly having a running orbit and a parking orbit. During operation of the crank assembly in the running orbit the wiper blades are moved throughout a wiping stroke, the inboard limit of which is above the cowl of the vehicle. However, during operation of the crank assembly in the parking orbit the inboard stroke end limit is against the cowl of the vehicle, and during the operation in the parking orbit suitable parking switch means are actuated to deenergize the motor with the blades against the cowl in the depressed parked position.

The washer unit includes a pump comprising a flexible rubber, or rubber-like, bellows having a reciprocable rod attached thereto. The rod is urged in one direction by means of a compression spring, the compression spring tending to collapse the bellows and effect the delivery stroke thereof. The bellows communicates through suitable check valve means with a reservoir for liquid solvent and with conduits connected to washer nozzles having openings for discharging liquid solvent onto the outer surface of the vehicle windshield.

The worm gear driven by the electric motor has formed thereon an integral cam, which as depicted in this application has two lobes. However, it is to be understood that the number of lobes can be varied without departing from the spirit of this invention. Since a complete revolution of the worm gear results in movement of the wiper blades throughout a complete cycle, namely two strokes, the pump rod carries a follower engageable with the worm gear cam so that intermittent operation of the washer pump is timed with the stroke movement of the wiper blades. Thus the lobes on the cam are arranged so that the pump effects an intake and a delivery stroke during both the inboard stroke of the blades and the outboard stroke of the blades. However, it is possible to utilize only a single cam lobe on the worm gear and arrange the cam lobe so that the delivery stroke of the pump occurs during either the outboard stroke or the inboard stroke.

The pump also has an upstruck tang, or lug portion, which is engageable with a manually positionable cam pivotally mounted within the washer pump housing. To facilitate reciprocable movement of the pump rod, the pump rod is also formed with an elongate longitudinal slot through which the pivot pin for the cam extends. The cam is formed with two steps, the end portion of one of the steps constituting a switch actuator. The cam is normally biased by a spring so that the pump rod lug abuts the shoulder between the two steps and engages the lower step. Under these conditions, reciprocation of the pump rod is prevented during rotation of the worm gear, and hence the pump is inactive. However, the operator can energize the wiper motor through the wiper control switch without actuating the washer pump.

In order to actuate the washer pump conjointly with the wiper motor, the control cam must be displaced manually, either by a foot actuator or by a hand actuator. When the hand actuator is fully withdrawn, or the foot actuator is fully depressed, the lockout cam is moved to a position wherein the pump rod lug does not engage the lower step of the cam and accordingly the pump rod is free to reciprocate as controlled by the worm gear cam and the spring acting on the rod. Simultaneously, with movement of the lockout cam so that the lug does not engage the cam, a switch is closed for energizing the wiper motor. The washer will continue to intermittently squirt liquid solvent onto the windshield until either the hand knob is pushed inwardly to an intermediate position, or the foot actuator is released to an intermediate position. Suitable detents may be incorporated in the hand actuator for this purpose, if desired, to position the lockout cam so that the pump rod lug will reengage the lower step of the cam. However, the wiper motor will continue to operate since the switch has not been opened. When the liquid solvent is completely removed from the windshield, the operator can turn off the wiper motor by pushing the hand knob completely in, or releasing the foot actuator, thereby permitting the switch actuating portion of the cam to open the motor switch so that the parking mechanism can arrest the motor with the wiper blades in the depressed parked position.

The washer unit can be activated after the wiper motor has been previously turned on by manual actuation of the wiper control. However, irrespective of the speed setting of the manual control switch, the wiper motor will operate at high speed until the washer control switch is opened, after which the wiper motor will resume operating at the speed setting of the manual wiper control switch.

Further objects and advantages of the present invention will be apparent from the following description, reference being had to the accompanying drawings wherein a preferred form of the invention is clearly shown.

In the drawings:

Figure 1 is a fragmentary view, partly in section and partly in elevation, of a vehicle equipped with the windshield cleaning mechanism of this invention.

Figure 2 is a fragmentary view, partly in elevation and partly in section, of the washer unit with the lockout cam in the intermediate position.

Figure 3 is a fragmentary view similar to Figure 2 with the lockout cam in the "off" position.

Figure 4 is a fragmentary view similar to Figure 2 with the lockout cam in the "on" position.

Figure 5:
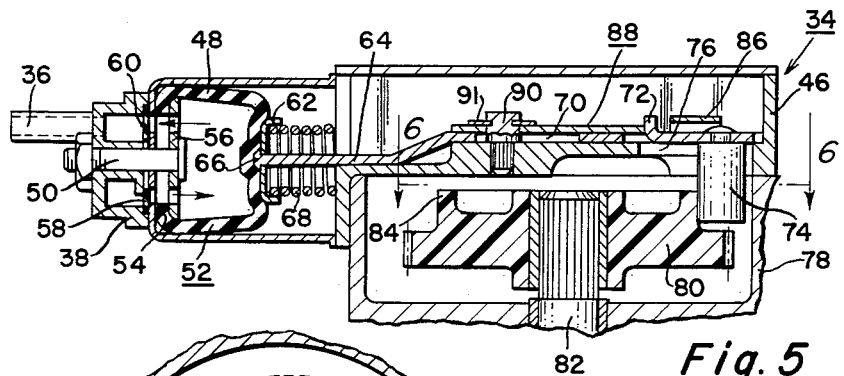
Figure 5 is a fragmentary sectional view taken along line 5—5 of Figure 2.

With particular reference to Figure 1, a portion of a vehicle is shown having a windshield 10, a cowl 12 and a firewall 14. The vehicle includes a wiper unit for the outer surface of the windshield 10 comprising a pair of wiper blades 16 carried by arms 18, the arms being drivingly connected to spaced pivot shafts 20. The pivot shafts 20 extend through the cowl portion 12 of the vehicle and have attached thereto crank arms 22, the outer ends of which are connected to the ends of connecting links 24. The inner ends of connecting links 24 are rotatably connected to a crank assembly 26 which is drivingly connected with a unidirectional electric motor 28 so that upon energization of the motor 28 rotation will be imparted to the crank assembly 26. Rotation of the crank assembly 26 imparts asymmetrical oscillation to the wiper arms 18 and wiper blades 16 through the links 24 and the crank arms 22, the left hand crank arm 22 extending above the pivot shaft 20 and the right hand crank arm 20 extending below the pivot shaft to facilitate asymmetrical oscillation. The crank assembly 26 and the wiper motor 28 may be of the type shown in the aforementioned copending application S.N. 686,432.

The vehicle also includes a washer unit comprising a reservoir 30 for liquid solvent to which an intake hose 32 for a washer pump 34 is connected. The washer pump connects with the intake hose 32 and a discharge tube 36 through a check valve assembly 38. The discharge tube 36 is connected to a T-coupling 40 to which the delivery hoses 42 are connected, the delivery hoses communicating with a pair of washer nozzles 44 by which means liquid solvent can be directed onto the windshield 10 into the path of movement of the wiper blades.

With particular reference to Figures 2 through 6, the pump 34 includes a pump rod housing 46 and a bellows housing 48. The check valve assembly 38 is connected to the bellows housing 48 by a bolt 50. An elastomeric bellows, or bulb, 52 is disposed within the housing 48, the open end of the bellows 52 having a lip 54 which is clamped between a perforated plate 56 and the inturned end of the housing 48 by the bolt 50. The check valve assembly 38 may include a flap-type one-way inlet valve 58 and a flap-type one-way outlet valve 60. Thus, upon compression of the bellows 52 liquid solvent contained therein will be discharged through check valve 60 into tube 36 and thence through the coupling 40 and the hoses 42 through nozzles 44 onto the windshield. Upon extension of the bellows 52 liquid solvent will be drawn in from the reservoir 30 through hose 32 and check valve 58.

The closed end of the bellows 52 is bonded, or otherwise suitably connected to a spring retainer 62. The spring retainer 62 has a central aperture which the end of a reciprocable pump rod 64 extends, the end of the pump rod being headed as indicated by numeral 66 so that upon movement of the pump rod 64 to the right when the bellows is collapsed the rod will positively expand the bellows. A compression spring 68 is disposed between the retainer 62 and the housing 46, the spring 68 being utilized to collapse the bellows 52 and effect the delivery stroke thereof.

Figure 6:
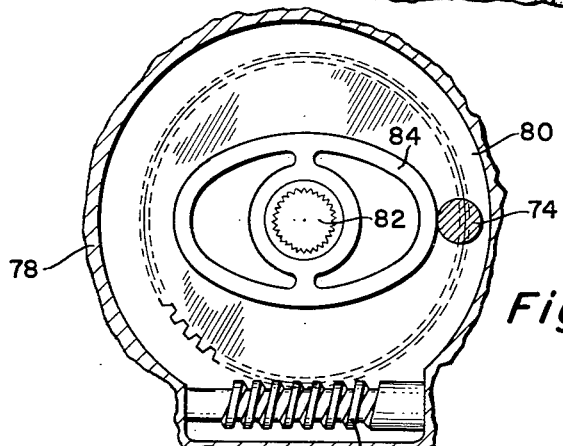
Figure 6 is a fragmentary sectional view taken along line 6—6 of Figure 5.

As seen particularly in Figures 2 and 5, the pump rod 64 has an elongated slot 70 therein and an upstruck tang, or lug, 72. In addition, the pump rod 64 has a roller type cam follower 74 attached thereto, the follower 74 extending through an elongated slot 76 in the housing 46. The housing 46 is suitably connected to a wiper motor housing 78 within which a worm gear 80 driven by the electric motor 28 is disposed. The worm gear 80 is attached to a shaft 82 which extends outside of the housing 78. The worm gear 80 has a two-lobe cam 84 formed integrally therewith on the upper side thereof as shown in Figures 5 and 6. The follower 74 is maintained in engagement with the cam 84 by the compression spring 68. In addition, the pump rod 64 is maintained in sliding engagement with housing 46 by a clamp plate 86 secured to the housing 46.

As seen in Figures 2 through 5, the washer pump 34 also includes a combined lockout cam and switch actuator, generally designed by the numeral 88. The cam 88 is mounted for pivotal movement about a pin 90 attached to the housing 46 and extending through the elongated slot 70 of the pump rod 64. The cam 88 is restrained against axial movement by a retaining ring 91.

The cam 88 has two steps 92 and 94 separated by a shoulder 96. The end portion 98 of the step 92 constitutes a switch actuator for switch mechanism mounted within the pump housing, which will be described hereinafter. The cam 88 has a lug 100 which supports one end of a compression spring 102, the other end of the spring 102 being seated in the housing 46. The spring 102 urges the cam 80 in a counterclockwise direction about the pivot pin 90, the limit position of the cam 80 being depicted in Figure 3, wherein the lug 72 of the pump rod engages the shoulder 96 on the cam. The lower end of the cam 88 is connected to the end of a Bowden control wire 106. The other end of the control wire 104 can be connected to a foot actuator depicted generally by the numeral 108, or a hand actuator depicted by dotted lines 110.

When the lug 72 of the pump rod engages the step 92 on the cam 88, reciprocation of the pump rod 64 due to rotation of the worm gear 80 is precluded. However, when the lockout cam 88 is in the position of Figure 4, wherein the step 92 is rotated out of the path of movement of the lug 72, the pump rod 64 will be reciprocated during rotation of the worm gear 80. Thus, as the worm gear 80 is rotated by the electric motor 28 through worm 85, the spring 68 will maintain the roller 78 in engagement with the cam surface 84. As the worm gear 80 rotates in the clockwise direction as viewed in Figure 6 the spring 68 will move the pump rod 64 to the left as viewed in Figures 2 through 5 thereby compressing the bellows 52 and effecting the delivery stroke of the washer pump. As the worm gear 80 continues to rotate, the pump rod 64 will be moved to the right due to engagement between the cam 84 and the follower 74 thereby compressing the spring 68 and expanding the bellows 52 to effect the intake stroke thereof. This intermittent operation of the pump in timed relation with oscillation, or stroking, of the wiper blades, will continue as long as the worm gear 80 rotates and the manually positioned lockout cam 88 is held in the position of Figure 4.

Figure 7:
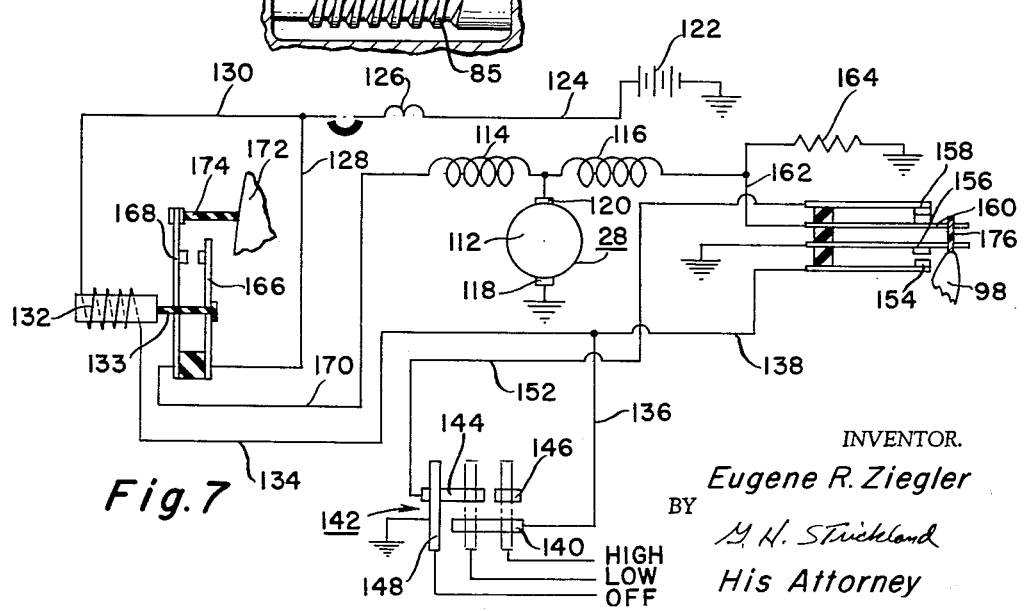
Figure 7 is an electric schematic of the control system for the wiper unit and the washer unit.

With particular reference to Figure 7, the circuit for controlling the wiper motor 28 will be described. The motor 28 is of the compound wound type and thus includes an armature 112, a series field winding 114 and a shunt field winding 116. One armature brush 118 is connected to ground and the other armature brush 120 is connected to the ends of the field coils 114 and 116. The motor 28 can be energized from a battery 122, one terminal of which is grounded and the other terminal of which is connected by a wire 124 through a thermal overload circuit breaker 126 to wires 128 and 130. Wire 130 is connected to the end of a relay coil 132, the other end of relay coil 132 being connected to a wire 134. Wire 134 is connected to a wire 136 and a wire 138. Wire 136 connects with a fixed contact 140 of a manual wiper control switch 142. The control switch 142 also includes fixed contacts 144 and 146, and a movable bridging contact 148 which is connected to ground. Contact 144 is connected to a wire 152, and the wire 138 is connected to a leaf spring switch contact 154 which is engageable with a second leaf spring contact 156 that is connected to ground. Wire 152 is connected to a leaf spring contact 158 which is engageable with a leaf spring contact 160, the leaf spring contact 160 being connected to a wire 162. The wire 162 is connected to one end of the shunt field winding 116 and to the end of a resistor 164. Resistor 164 constitutes the speed controlling resistor for the electric motor 28, and the other end thereof is connected to ground.

The wire 128 is connected to a leaf spring contact 166 which is engageable with a leaf spring contact 168. The leaf spring contact 168 is connected to a wire 170 which is connected to the other side of the series field winding 114. The leaf spring 166 can be moved to the left as in Figure 7 upon energization of the relay coil 132, which energization moves the relay plunger 133 to the left. The plunger 133 has an insulated headed end engageable with the leaf spring 166. The leaf spring 168 can be moved to the left, as viewed in Figure 7, by a cam 172 associated with the windshield wiper actuating mechanism. The cam 172 engages a switch actuator 174 attached to the leaf springs 168 when the wiper blades arrive in the parked position against the cowl of the vehicle as depicted in Figure 1. The details of the parking switch actuating mechanism, including leaf spring contacts 166 and 168, the relay plunger 133, the cam 172 and the actuator 174 are disclosed in the aforementioned copending application S.N. 686,432.

The leaf springs 156 and 160 are interconnected by an insulating bar 176 which can be engaged by the end portion 98 of the lockout cam 88. As depicted in Figure 7, the end portion 98 of the lockout cam is in engagement with the bar 176 and has moved leaf spring contact 156 out of engagement with the leaf spring contact 154 while moving leaf spring contact 160 into engagement with leaf spring contact 158. The leaf springs 154, 156, 158 and 160 constitute the washer unit control switch mechanism.

Operation of the improved cleaner mechanism of this invention is as follows. The wiper motor 28 may be energized by the manual control switch 142 so as to effect oscillation of the wiper blades 16 without activating the washer unit. When the bridging contact 148 is moved to the low speed position, depicted by dotted line in Figure 7, the relay coil 132 will be energized from the battery 122 through wire 124, overload switch 126, wire 130, relay coil 132, wire 134, wire 136, stationary contact 140 and movable contact 148. Upon energization of the relay 132, the relay plunger 133 will move leaf spring 166 into engagement with leaf spring 168 whereupon the motor 28 will be energized from the battery through wire 128, switch contacts 166 and 168, wire 170, the series field winding 114, brush 120, armature 112 and brush 118 which is connected to ground. The shunt field winding 116 is also energized from the battery 122 since it is connected to the brush 120, the other end of the shunt field winding being connected by wire 162, leaf spring contacts 158 and 160, wire 152, stationary contact 144 and movable contact 148 to ground.

When the bridging contact 148 is moved to the high speed position, as indicated in dotted lines in Figure 7, resistor 164 is connected in series with the shunt field winding 166 so as to reduce the energization of the shunt field winding thereby causing the motor 28 to run at a faster speed. When the brush contact 148 is moved to the "off" position, the relay 132 will be deenergized. The motor 28 will continue to be energized however, since contacts 166 and 168 remain in engagement until the crank assembly moves into its parking orbit and the blades arrive at the depressed parked position, at which time the cam 172 will move contact 168 out of engagement with contact 166 through the actuator 174 so as to deenergize the motor.

The washer unit can be activated so as to effect conjoint operation of the washer unit and the wiper unit irrespective of whether the manual control switch 142 is in the "on" or "off" position. Assuming the manual control switch 148 to be in the "off" position, upon pulling of the hand control 110, or depressing the foot control 108, the Bowden control wire 104 will be moved to the left as viewed in Figure 3 so as to move the lockout cam 88 to the position of Figure 4. This movement will disengage the lug 72 from the step 92 of the lockout cam and permit the spring 68 to compress the bellows 52 and effect a delivery stroke of the pump as soon as the worm gear 80 rotates throughout 90°. The motor 28 will be energized by movement of the lockout cam 88 to the position of Figure 2, since the switch contact 156 energizes the switch contact 154 while switch contacts 158 and 160 are separated. When contacts 154 and 156 are in engagement, the relay coil 132 will be energized from the battery 122 so as to closed the parking switch contacts 166 and 168 to energize the motor 28. Moreover, motor 28 will be energized for high speed, since contacts 158 and 160 are separated thereby connecting resistor 164 in series with the shunt field winding 116. Thus, the wiper unit and the washer unit will be conjointly operated with liquid solvent being intermittently squirted onto the windshield into the path of the moving wiper blades as long as the hand control 110 remains in the outermost position, or the foot control 108 is fully depressed so that the lockout cam 88 is held in the position of Figure 4. A soon as the driver determines enough liquid solvent has been discharged onto the windshield, he moves the hand control 110 to an intermediate position, or partially releases the foot control 108, so that the cam 88 assumes the position of Figure 2. In this position, the step 92 is inserted into the path of movement of the lug 72, and prevents reciprocation of the pump rod 64. The motor 28 continues to be energized, since switch actuating end 98 of the cam 88 does not engage the bar 176. As soon as the operator determines that the windshield is sufficiently dry, the hand actuator 110 is moved fully in, or the foot actuator 109 is fully released, at which time the end portion 98 will engage the bar 176 so as to separate contacts 154 and 156 and engage contacts 158 and 160. This will connect the motor 28 for low speed operation since the shunt field winding 116 is directly connected to ground through wire 162, contacts 158 and 160, wire 152, contact 144 and contact 142. Separation of contacts 154 and 156 deenergizes the parking switch relay 132 but as aforementioned the contacts 166 and 168 remain in engagement until the crank assembly goes into its parking orbit and the blades arrive at the depressed parked position at which time the cam 172 will move the leaf spring 168 through the actuator 174 to deenergize the motor.

Assuming that the manual control switch 148 is in the low speed position when it is desired to apply liquid solvent onto the windshield, the only effect of moving the lockout cam 88 from the position of Figure 3 to the position of Figure 4, is to release the pump rod 64 for reciprocation and connect the resistor 164 in series with the shunt field winding 116 so as to operate the motor at high speed. If the manual control switch 142 is set in the high speed position, the motor 28 will continue to run at high speed upon activation of the washer unit.

From the foregoing it is apparent that the present invention provides a simple control mechanism for effecting conjoint operation of a washer unit and a wiper unit, wherein the washer unit is of the intermittent squirt type, and the delivery strokes of the washer unit are in timed relation with the stroking, or oscillating movement of the wiper blades. Moreover, the control mechanism disclosed herein enables the driver to determine the amount of liquid solvent he wishes to have applied to the windshield to meet different conditions and also enables the driver to determine the number of wiping strokes required to dry the windshield after the pump has been inactivated.

While the embodiment of the invention as herein disclosed constitutes a preferred form, it is to be understood that other forms might be adopted.

What is claimed is as follows:

1. A windshield cleaning system including, a washer unit including a pump, a wiper unit, a single motor for operating both of said units, first manually controlled means for activating said motor, an interruptible driving connection between said pump and said motor, and second manually controlled means for activating said motor independently of said first manual means, said second manual means being operative to establish the driving connection between said pump and said motor in one position and operative to interrupt the driving connection between said pump and said motor in another position while the motor is operating.

2. A windshield cleaning system including, an intermittent squirt type washer unit, a wiper unit, first manually controlled means for activating said wiper unit independent of said washer unit, and second manually controlled means including a control for setting both units in operation for conjoint operation and controlling the period of conjoint operation.

3. A windshield cleaning system including a washer unit including a pump, a wiper unit, a single motor for actuating said wiper unit and said pump, an interruptible driving connection between said pump and said motor, and manually operable control means having a first position for controlling operation of the motor and establishing said driving connection, and a second position for controlling operation of the motor and interrupting said driving connection.

4. A windshield cleaning system including, a washer unit including a pump, a wiper unit, a single motor for actuating said wiper unit and said pump, an interruptible driving connection between said pump and said motor, and a manually positionable element having a first position wherein the motor is activated and said driving connection is established, a second position wherein the motor is activated and said driving connection is interrupted, and a third position wherein said motor is inactivated and said driving connection is interrupted.

5. A windshield cleaning system including, a washer unit including a pump, a wiper unit, a single motor for actuating said wiper unit and said pump, first manually controlled means for activating said motor, an interruptible driving connection between said pump and said motor, and second manually controlled means having a first position wherein the motor is activated and said driving connection is established, a second position wherein the motor is activated and said driving connection is interrupted, and a third position wherein said wiper motor is inactivated and said driving connection is interrupted.

6. A windshield cleaning system including, an intermittent squirt type washer unit, a wiper unit, first manually controlled means for activating said wiper unit independently of said washer unit including means for controlling the speed of said wiper unit, and second manually controlled means including a control for setting both units in operation for conjoint operation and controlling the period of conjoint operation.

7. Windshield cleaning apparatus including, a solvent reservoir, an intermittent squirt type power driven pump connectible to the reservoir and operable to spray solvent onto the windshield, a power driven wiper unit operable to wipe the windshield, a manual control for the pump, a primary control for the wiper unit, and a secondary control for the wiper unit including said pump control for setting said wiper unit and said pump in operation for conjoint operation and controlling the period of conjoint operation..

8. A windshield cleaning system including, a wiper unit, a washer unit including a pump, an electric motor having continuous driving connection with said wiper unit and an interruptible driving connection with said pump, and manually operable control means for energizing said motor and establishing the driving connection between the said motor and said pump to effect conjoint operation of the wiper unit and the washer unit and controlling, the period of conjoint operation.

9. A windshield cleaning system including, a wiper unit, a washer unit including a pump, an electric motor having continuous driving connection with said wiper unit and an interruptible driving connection with said pump, a circuit for energizing said motor including switch means, and a manually positionable element coacting with said switch means and having three positions, namely, a first position wherein said switch means are open and said driving connection is interrupted, a second position wherein said switch means are closed and said driving connection is interrupted, and a third position wherein said switch means are closed and said driving connection is established.

10. The system set forth in claim 9 including a second circuit for energizing said motor to effect wiper unit operation independently of said washer unit including speed control means for said motor.

11. A washer pump unit for a vehicle windshield including, a motor having a rotating element with a cam, a rod having a follower, resilient means acting on said rod and maintaining said follower in engagement with said cam whereby rotation of said element imparts rectilinear motion to said rod, a pump having a fluid displacing member operatively connected with said rod and having an intake stroke and a delivery stroke, and a spring biased, pivotally mounted cam selectively engageable with said rod for precluding reciprocation of said rod during rotation of said element.

12. The washer set forth in claim 11 wherein said pump rod has an upstruck lug engageable with said cam for preventing reciprocation of said pump rod during rotation of said element.

13. A washer pump unit for a vehicle windshield including, an electric motor having a rotating element with a cam, a rod having a follower, resilient means acting on said rod and maintaining said follower in engagement with said cam whereby rotation of said element imparts movement to said rod, a pump having a fluid displacing member operatively connected with said rod and having an intake stroke and a delivery stroke, switch means for controlling the energization of said electric motor, and a pivotally mounted cam selectively engageable with said rod for precluding movement of said rod during rotation of said element, said cam also constituting an actuator for said switch means.

14. A washer pump unit for a vehicle windshield including, an electric motor having a rotating element with a cam, a rod having a follower, resilient means acting on said rod and maintaining said follower in engagement with said cam whereby rotation of said element imparts movement to said rod, said rod having an elongate longitudinal slot therein, a pump having a fluid displacing member operatively connected with said rod and having an intake stroke and a delivery stroke, a stationary pin extending through the slot in said rod, a cam pivotally mounted on said pin and selectively engageable with said rod for precluding movement of said rod during rotation of said element, and resilient means engaging said pivotally mounted cam for normally positioning the same.

15. The washer pump set forth in claim 11 including a manually positionable Bowden wire connected to said cam for controlling the position thereof.

References Cited in the file of this patent

UNITED STATES PATENTS

| | | |
|---|---|---|
| 1,738,884 | Gearhart | Dec. 10, 1929 |
| 2,162,985 | West | June 20, 1939 |
| 2,274,293 | Horton | Feb. 24, 1942 |
| 2,499,298 | Christensen | Feb. 28, 1950 |
| 2,743,473 | Oishei | May 1, 1956 |
| 2,811,735 | Oishei et al. | Nov. 5, 1957 |
| 2,878,505 | Ziegler | Mar. 24, 1959 |

FOREIGN PATENTS

| | | |
|---|---|---|
| 371,898 | Great Britain | June 15, 1955 |